United States Patent
Unnerstall et al.

(10) Patent No.: US 11,538,012 B2
(45) Date of Patent: Dec. 27, 2022

(54) SYSTEMS AND METHODS FOR GENERATING A SHARED PAYMENT VIA VOICE-ACTIVATED COMPUTING DEVICES

(71) Applicant: MASTERCARD INTERNATIONAL INCORPORATED, Purchase, NY (US)

(72) Inventors: Rick Unnerstall, O'Fallon, MO (US); Zhenni Hu, O'Fallon, MO (US); Brian Williams, St. Peters, MO (US); Christopher Eric Mullen, St. Peters, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 16/272,957

(22) Filed: Feb. 11, 2019

(65) Prior Publication Data

US 2020/0258072 A1 Aug. 13, 2020

(51) Int. Cl.
*G06Q 20/22* (2012.01)
*G06Q 20/40* (2012.01)
(Continued)

(52) U.S. Cl.
CPC .......... *G06Q 20/227* (2013.01); *G06F 3/167* (2013.01); *G06Q 20/308* (2020.05);
(Continued)

(58) Field of Classification Search
CPC .... G06Q 20/227; G06Q 20/401; G06F 3/167; G10L 15/22; G10L 2015/223
See application file for complete search history.

(56) References Cited

U.S. PATENT DOCUMENTS

| | | | |
|---|---|---|---|
| 7,360,694 B2* | 4/2008 | Wankmueller | G07C 9/257 235/382 |
| 7,370,794 B2* | 5/2008 | Trane | G07F 7/02 235/492 |

(Continued)

OTHER PUBLICATIONS

"Origins of voice search and voice recognition" by Tom Crewe, Adido, dated Apr. 15, 2018 https://www.adido-digital.co.uk/blog/origins-of-voice-search-and-voice-recognition/ (Year: 2018).*

(Continued)

*Primary Examiner* — Bennett M Sigmond
*Assistant Examiner* — Raven E Zeer
(74) *Attorney, Agent, or Firm* — Armstrong Teasdale LLP

(57) ABSTRACT

A data controller computing device is configured to receive, from a voice-controlled (VC) computing device, a shared payment initialization request identifying a primary user payment account associated with the VC computing device. The DC computing device creates a shared payment account linked in a database to the primary user payment account. The DC computing device also receives secondary user information, and links in the database at least one secondary user payment account to the shared payment account. Additionally, the DC computing device transmits a shared payment account identifier to the VC computing device. The DC computing device receives, via a payment network, a transaction authorization request including the shared payment account identifier, a merchant identifier, and a transaction amount. The DC computing device applies respective portions of the transaction amount against each of the primary user account and the at least one secondary user payment account.

20 Claims, 4 Drawing Sheets

(51) Int. Cl.
*G06F 3/16* (2006.01)
*G06Q 20/38* (2012.01)
*G06Q 20/30* (2012.01)
*G10L 15/22* (2006.01)

(52) U.S. Cl.
CPC ......... *G06Q 20/385* (2013.01); *G06Q 20/401* (2013.01); *G10L 15/22* (2013.01); *G10L 2015/223* (2013.01)

(56) References Cited

U.S. PATENT DOCUMENTS

| | | | |
|---|---|---|---|
| 7,792,699 B2 | 9/2010 | Kwei | |
| 7,970,654 B2 | 6/2011 | Clibanoff | |
| 3,458,086 A1 | 6/2013 | Bishop et al. | |
| 3,655,747 A1 | 2/2014 | Clibanoff | |
| 9,355,394 B2 | 5/2016 | Gupta | |
| 2009/0119190 A1* | 5/2009 | Realini | G06Q 20/3265 705/37 |
| 2009/0125446 A1* | 5/2009 | Saunders | G06Q 20/20 235/379 |
| 2010/0121745 A1* | 5/2010 | Teckchandani | G06Q 40/12 705/40 |
| 2011/0189981 A1* | 8/2011 | Faith | G06Q 20/389 455/414.1 |
| 2012/0143753 A1* | 6/2012 | Gonzalez | G06Q 20/12 705/41 |
| 2012/0173396 A1 | 7/2012 | Melby et al. | |
| 2013/0211944 A1 | 8/2013 | Momin et al. | |
| 2014/0164221 A1 | 6/2014 | Sinton et al. | |
| 2014/0164234 A1* | 6/2014 | Coffman | G06Q 20/227 705/40 |
| 2014/0188710 A1* | 7/2014 | Basu | G06Q 20/023 705/39 |
| 2014/0222663 A1* | 8/2014 | Park | G06Q 20/027 705/39 |
| 2015/0120344 A1 | 4/2015 | Rose | |
| 2015/0142657 A1 | 5/2015 | Sagastiverza et al. | |
| 2015/0142673 A1 | 5/2015 | Nelsen et al. | |
| 2015/0199679 A1 | 7/2015 | Palanisamy et al. | |
| 2015/0310408 A1* | 10/2015 | Anderson | G06Q 10/02 705/39 |
| 2016/0042328 A1 | 2/2016 | Teckchandani et al. | |
| 2016/0042420 A1 | 2/2016 | Purcell et al. | |
| 2016/0048822 A1 | 2/2016 | Forrest | |
| 2016/0189123 A1 | 6/2016 | Lucia Specogna et al. | |
| 2016/0260115 A1* | 9/2016 | Badger | G06Q 20/20 |
| 2017/0024739 A1* | 1/2017 | Todasco | G06Q 20/227 |
| 2017/0173460 A1* | 6/2017 | Leu | G06F 1/1698 |
| 2017/0337546 A1* | 11/2017 | Holmes | G06Q 40/00 |
| 2017/0337558 A1* | 11/2017 | Corritori | G06Q 20/20 |
| 2018/0082283 A1* | 3/2018 | Sharma | G06Q 20/42 |
| 2018/0336543 A1* | 11/2018 | Van Os | H04L 67/1078 |
| 2019/0141021 A1* | 5/2019 | Isaacson | G06Q 50/01 |

OTHER PUBLICATIONS

History of Voice Recognition by Marc Assens, Happy Scribe, dated Feb. 19, 2018 https://www.happyscribe.com/blog/history-voice-recognition/ (Year: 2018).*

"Speech recognition: Your smartphone gets smarter" by Serdar Yegulalp, ComputerWorld, dated Mar. 16, 2011 https://www.computerworld.com/article/2506688/speech-recognition-your-smartphone-gets-smarter.html?page=2 (Year: 2011).*

* cited by examiner

SYSTEMS AND METHODS FOR GENERATING A SHARED PAYMENT VIA VOICE-ACTIVATED COMPUTING DEVICES

BACKGROUND

This disclosure relates generally to voice-activated payment services and, more specifically, to facilitating shared payments for group purchases in real-time over a network using at least one voice-controlled computing device.

Groups of users/consumers are often presented with purchasing situations in which each member of the group is expected to pay for a portion of a purchase. One very common situation is when a group decides to order pizza for delivery. In certain instances, the restaurant/merchant may not be able or willing to generate individual bills for each consumer and, as a result, one consumer generally pays for the meal under the assumption that he or she will be reimbursed by the other members of the group. Settling up between the payee and the other group members may be unreliable and usually involves one or more of a cash exchange, later settlement through electronic payment transfers (e.g., visiting a brick-and-mortar financial institution to initiate such a transfer, mobile device transfer platforms, or online fund-sharing platforms) or a later promise that the group member will pay back the payee in kind. Tracking such exchanges may lead to differing memories of how much one group member currently owes another group member.

Alternatively, an individual user may encounter purchasing situations in which the user wants to make a purchase using multiple funding sources or accounts including, without limitation, one or more credit card accounts and bank accounts. For example, an individual may want to share a purchase cost between various sources for various reasons including, without limitation, avoiding maxing out a credit limit, avoiding overdrawing a bank account, maximizing purchasing rewards, and the like.

The amount of time spent performing group purchases may also be increased as consumers try to negotiate or otherwise determine how to fund the purchase and ensure that the payee is adequately reimbursed. In some cases, consumers may completely forego a purchase due to their dissatisfaction or because they are unable to make the purchase by relying on multiple funding sources. The ubiquity of multi-account purchasing situations renders undesirable the known systems in which a consumer or group of consumers is limited to paying using an individual's single payment card account. For example, such known systems are inconvenient and lead to consumer dissatisfaction because consumers are unable to pay for a purchase as they wish.

Moreover, the "Internet of Things" (IoT) has increased interconnectivity between the Internet and previously unconnected items, such as watches, refrigerators, automobiles, speakers, microphones, and other devices formerly not connected to the Internet. The IoT enables new functionality for these items, which, in some cases, can make the lives of users more efficient and more enjoyable. For example, voice-controlled computing devices with Internet connectivity functionality may enable users to access a variety of websites, get information from the Internet, and even control other devices (e.g., thermostats, lights, televisions, or the like) that may be connected to the voice-controlled computing devices. This can be accomplished simply with the input of a user's voice command. These voice-controlled computing devices have many benefits including ease of use and variety of uses. In view of the multitude of accessible services available through voice-controlled computing devices there is, however, a lack of accommodation for group purchase shared payment options via voice-controlled devices and systems. In fact, there is currently no system capable of providing shared payments via voice-activated services for group purchase experiences that includes generation of a single virtual account for presentation to a merchant, and automatically applies payments submitted under the single virtual account proportionately against multiple payment accounts of the group.

Accordingly, voice-controlled systems and methods are needed that enable groups of two or more users to easily and effectively make a purchase while automatically sharing the cost, thus resolving the inefficiencies and inconvenience of known single payment account systems. The systems and methods described herein resolve at least these known deficiencies.

BRIEF DESCRIPTION OF THE DISCLOSURE

In one aspect, a data controller (DC) computing device for making a shared payment group purchase over a payment network is provided. The DC computing device includes a processor and a memory. The DC computing device is communicatively coupled to a database and configured to receive, from a voice-controlled (VC) computing device, a shared payment account initialization request identifying a primary user payment account associated with a primary user of the VC computing device. The DC computing device also is configured to create a shared payment account linked in the database to the primary user payment account. The DC computing device further is configured to receive secondary user information identifying at least one secondary user payment account, and link in the database the at least one secondary user payment account to the shared payment account. Additionally, the DC computing device is configured to transmit a shared payment account identifier to the VC computing device. The shared payment account identifier is linked in the database to the shared payment account. The DC computing device also is configured to receive, via the payment network, a transaction authorization request including the shared payment account identifier, a merchant identifier, and a transaction amount. The DC computing device further is configured to apply respective portions of the transaction amount against each of the primary user account and the at least one secondary user payment account linked to the shared payment account identifier.

In another aspect, a method for making a shared payment group purchase over a payment network is provided. The method is performed using a data controller (DC) computing device including a processor communicatively coupled to a memory. The DC computing device is communicatively coupled to a database. The method includes receiving, from a voice-controlled (VC) computing device, a shared payment account initialization request identifying a primary user payment account associated with a primary user of the VC computing device. The method also includes creating a shared payment account linked in the database to the primary user payment account. The method further includes receiving secondary user information identifying at least one secondary user payment account, and linking in the database the at least one secondary user payment account to the shared payment account. Additionally, the method includes transmitting a shared payment account identifier to the VC computing device. The shared payment account identifier is linked in the database to the shared payment account. The method also includes receiving, via the payment network, a transaction authorization request including the shared payment account identifier, a merchant identifier, and a transaction amount. The method further includes applying respective portions of the transaction amount against each of the primary user account and the at least one secondary user payment account linked to the shared payment account identifier..

In another aspect, a non-transitory computer-readable storage medium having computer-executable instructions embodied thereon is provided. When executed by at least one processor, the at least one processor being communicatively coupled to a database, the computer-executable instructions cause the at least one processor to receive, from a voice-controlled (VC) computing device, a shared payment account initialization request identifying a primary user payment account associated with a primary user of the VC computing device. The computer-executable instructions also cause the at least one processor to create a shared payment account linked in the database to the primary user payment account. The computer-executable instructions further cause the at least one processor to receive secondary user information identifying at least one secondary user payment account, and link in the database the at least one secondary user payment account to the shared payment account. Additionally, the computer-executable instructions cause the at least one processor to transmit a shared payment account identifier to the VC computing device. The shared payment account identifier is linked in the database to the shared payment account. The computer-executable instructions also cause the at least one processor to receive, via the payment network, a transaction authorization request including the shared payment account identifier, a merchant identifier, and a transaction amount. The computer-executable instructions further cause the at least one processor to apply respective portions of the transaction amount against each of the primary user account and the at least one secondary user payment account linked to the shared payment account identifier.

Figure 1:
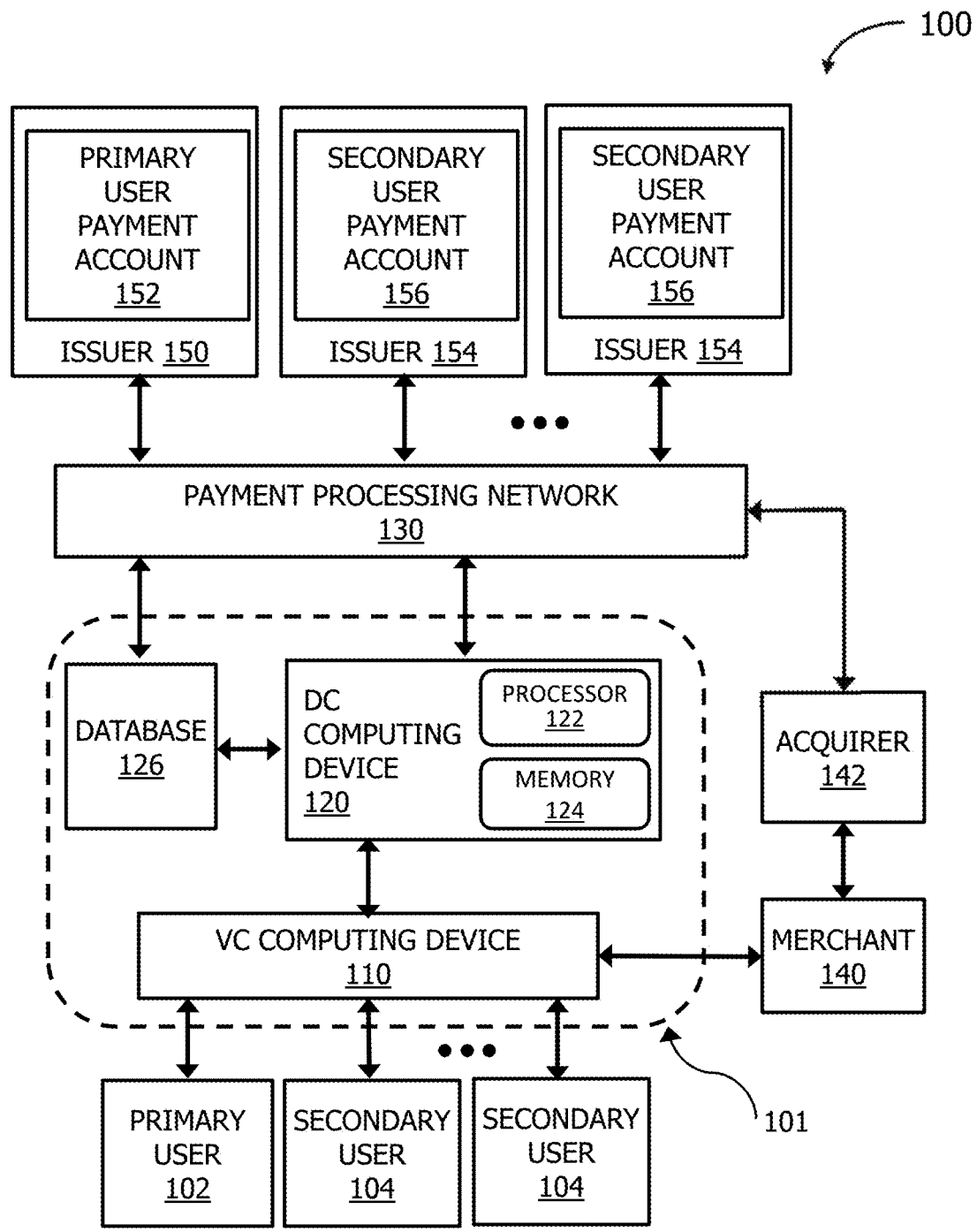
FIG. 1 is a block diagram of an example multi-party payment processing system in data communication with a virtual shared payment (VSP) system.

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The embodiments described herein include a virtual shared payment (VSP) system that includes a data controller (DC) computing device in data communication with a voice-controlled (VC) computing device, and methods for providing voice-activated services for shared payment of group purchases in real-time. As defined herein, the term "virtual" shared payment account indicates that the shared payment account does not have all of the attributes of a fully functional payment account, but is associated with a shared payment account identifier having the form and appearance of a traditional payment account identifier and has some limited payment account functionality, as will be described herein. As defined herein, the term "real-time" relates to the VSP system processing data within a short period of time or as the user is performing the tasks with a computing device (e.g., milliseconds to seconds, or possibly minutes depending upon the task) so that the data output and/or input is available virtually immediately. In the example embodiment, the VC computing device has a user interface that enables the user to make purchases via the Internet (as well as perform other tasks, such as paying bills or invoking a search engine) by submitting voice commands directly to the user interface. The VC computing device may be, for example, an Amazon ECHO® (Amazon and Amazon ECHO are registered trademarks of Amazon.com Incorporated located in Seattle, Wash.), Google HOME™ (Google and Google HOME are trademarks of Google Incorporated located in Mountain View, Calif.), or other devices that are capable of performing tasks on-line in response to voice commands.

In the exemplary embodiment, the VSP system facilitates two or more users (e.g., consumers or buyers) in purchasing a good and/or service (collectively an "item") from a merchant (e.g., a supplier or seller). Because the purchase is a group purchase, the users wish to share between them the total cost of the purchase. In response to one of the users initiating the shared payment group purchase with a voice command to the VC computing device, the DC computing device is configured to create, and store in a database accessible to a payment processing network, a virtual shared payment account. Each user participating in the purchase provides account data to the VSP system, and the VSP system effectively bundles each user's account data into the virtual shared payment account. In some embodiments, the VSP system also performs one or more authentication tasks to authenticate/validate the account data for each user, including voice recognition and/or other tasks performed at the VC computing device. After the shared payment account is created and an identifier is provided to the VC computing device for use in making the desired voice-activated purchase, the DC computing device receives a transaction authorization request via the payment processing network that includes the shared payment account identifier. The DC computing device performs a database lookup based on the shared payment account identifier to determine how to allocate the transaction amount proportionately among the associated user accounts. The DC computing device sends out suitable messages/communications over the payment processing network such that each user's account is charged/debited accordingly. In some embodiments, the shared payment account is maintained as active for a period of time in order to apply that same virtual single account number to subsequent purchases made by the same group of users. The VSP system, including at least one DC computing device communicatively coupled to at least one VC computing device, is a specifically configured computing system that is capable of functioning as described herein, including a dedicated DC computing device associated solely with the VSP system. In the example embodiment, the DC and VC computing devices each include a processor in communication with a memory.

The VSP system further includes a database in wired and/or wireless communication with the DC computing device. In some embodiments, the database is a centralized database that is integral to the DC computing device. In alternative embodiments, the database is a separate component and external to the DC computing device. The database is accessible to the DC computing device and is configured to store and/or otherwise maintain a variety of information, as described further herein. Moreover, in the example embodiment, the database is accessible to a payment processing network, either directly or via the DC computing device. For example, the database may store shared payment account identifiers, user account data, user account controls/rules, shared payment account controls/rules, user authentication/user verification rules and data, payment processing rules, and/or any other suitable data and/or information. The database is configured to store data that enables efficient and seamless shared payment group purchases via a single virtual shared payment account presented to a merchant for payment, and subsequent application of respective portions of the transaction amount against the individual user accounts of the group.

In the example embodiment, the VC computing device includes functionality that enables a user to enroll or register with the VC computing device as a primary user of the VC device. For example, when a user initially sets up the VC computing device for use in the user's home, the user becomes the primary user of the VC device. Accordingly, the primary user's profile will also serve as the active device profile (e.g., default profile). For general purposes of making purchases on-line via voice commands to the VC device, the primary user will link at least one payment account of the primary user to the VC computing device. For example, the primary user may electronically link a digital wallet to the VC computing device as the primary user account. Accordingly, when the primary user commands the VC computing device to make a shared purchase, the previously established primary user payment account is automatically submitted to the DC computing device to be linked to the virtual shared payment account created by the DC computing device. In alternative embodiments, the previously established primary user payment account is not automatically added to the shared payment account initialization request and/or the primary user has an option to override the previously established primary user payment account, and in such cases the primary user will be prompted to input payment account data along with the secondary users in the fashion described below.

For example, if the primary account of the primary user is associated with payment processor "A" (e.g., the Mastercard payment card system payment processing network, discussed below), then the shared payment account also will be associated with payment processor "A". Continuing with the example, payment processor "A" will also serve as the payment processor for the shared payment account and will provide a shared payment account identifier to the VC computing device for presentation to the merchant in the group purchase transaction.

In the example embodiment, the VC computing device is configured to activate by identifying or recognizing a pre-designated spoken trigger word. For example, the user may say the name of the device, and the VC computing device may reply, via a speaker, "How may I help you?" In alternative embodiments, the VC computing device is configured to activate by identifying a typed code and/or a character (e.g., alphanumeric, alphabetic, numeric, symbols—either individually or in combination). In other embodiments, the VC computing device is configured to activate by any suitable means that enables the VC computing device to function, as described herein.

In the example embodiment, the VC computing device is configured to receive a voice command including instructions to make a purchase from a merchant and split the cost between at least two users. For example, a user (such as the primary user of the VC device) will say an activation word to activate the VC computing device, followed by a spoken command such as "create a group payment for three people, evenly shared." Alternatively, the user may instruct the VC computing device to share the total cost among group members in any selected proportion (such as according to percentages, ratios, or absolute portion amounts). In response to the voice command, the VC computing device generates an electronic signal, i.e., a shared payment account initialization request, that identifies the primary user payment account, and transmits the shared payment account initialization request to the DC computing device.

In the example embodiment, in response to the shared payment account initialization request, the DC computing device is configured to create a shared payment account linked in the database to the primary user payment account. The DC computing device populates the virtual shared payment account with relevant data. In the example embodiment, the VC computing device is configured to request, from at least one secondary user, payment account data of the secondary user to be associated with the shared payment account. In some embodiments, requesting payment account data from at least one secondary user includes an audio/voice prompt by the VC computing device requesting data from the secondary user. For example, the VC computing device will say "Group payment created. Who's next and what's your payment type?" Payment types may include bank accounts, credit cards, debit cards, prepaid cards, PAYPAL accounts, VENMO accounts, and the like. In some embodiments, all secondary users will provide the same type of payment account. In other embodiments, at least two secondary users of the group will provide different types of payment accounts.

In the example embodiment, the VC computing device is configured to send the secondary user information to the DC computing device separately from the shared payment account initialization request. For example, the VC computing device prompts for secondary user information in response to a notification from the DC computing device that the shared payment account has been successfully created based on the submitted shared payment account initialization request. Alternatively, the VC computing device is configured to send the secondary user information to the DC computing device concurrently with the shared payment account initialization request, such as in a single message. For example, the VC computing device is configured to prompt for secondary user information prior to sending the shared payment account initialization request to the DC computing device. In alternative embodiments, the VC computing device is configured to prompt for secondary user information and/or transmit the secondary user information to the DC computing device at any suitable time.

In response to the prompt for information, each secondary user will respond to the VC computing device by speaking at least a portion of the corresponding secondary user information. In some embodiments, each secondary user may audibly provide a name, payment card number or other payment account number, and other payment card/account related information (e.g., a PIN number, an expiration date, and/or a security code number). In certain embodiments, the secondary user provides only certain identifying information via voice. For example, the user audibly provides a phone number or email address. In response to receiving the phone number or email address, the VC computing device is configured to transmit a secondary user payment account request message to the phone number or email address. The request message includes a link to an application or a web-hosted payment page that, for example, directs the user to select a payment method based on the user's digital wallet or, alternatively, provides fillable data fields for the user to populate with data defining the payment account of choice (e.g., a bank/ checking account, a debit card, a credit card, a prepaid card). The secondary user accesses the message, for example on the secondary user's mobile device (e.g., a smart phone, table, etc.), and responds with the requested secondary user information.

In some embodiments, the submission of secondary user information includes a verification process. For instance, the VSP system may verify a secondary user's connection to the provided secondary user payment account. In the example embodiment, the VSP system may use biometric sample data such as a retinal scan, fingerprint, voice recognition, face recognition, and/or any other biometric check, and compare the sample against biometric reference data associated with the secondary user payment account. For example the biometric reference data is stored by the payment processing network. Additionally or alternatively, the VSP system may require a password, PIN number, and/or a verification code or token, such as input via the secondary user's mobile device or spoken to the VC computing device. Accordingly, only users that pass the verification process will be added/linked to the shared payment account and participate in the shared payment group purchase services offered via the VSP system. By using the VSP system, users can have increased confidence in the security of their payment account data while making a group purchase, because they are not providing individual payment account data directly to a merchant, which may or may not be a secure transaction. Additionally, merchants can have increased confidence in purchases being made with the shared payment account because the individual payment accounts associated with the shared payment account have already been verified by the VSP system.

In another example embodiment, if a user has a digital wallet service account (e.g., MASTERPASS® by Mastercard), the user may audibly reply "Masterpass, John Doe" in response to the VC computing device's request for payment account information. In this example, VSP system is configured to retrieve John Doe's payment account data using the 'Masterpass+name' identifier. In this embodiment, the user's voice may also serve as a voice recognition biometric for authentication/verification against previously stored biometric data of the user associated with the Masterpass account. In other words, the simple audible reply "Masterpass, John Doe" effectively serves both to provide and to verify user payment account data to the VSP system.

In some embodiments, the VC computing device is configured to provide each secondary user with a confirmation message that the secondary payment account information has been successfully linked to the shared payment account. The confirmation message may further indicate that the payment account was verified. The confirmation message may be an audio-type confirmation delivered by the VC computing device. For example, the VC computing device may respond audibly in real-time, such as by speaking, "Thank you John Doe, you have been added to the group purchase." Additionally or alternatively, the confirmation message may be sent from the VC computing device to the user's mobile device (e.g., a text/SMS message or an email sent to the user's email address) or transmitted in any other suitable fashion. In certain embodiments, the VSP system transmits a negative confirmation message to the secondary user if the secondary user information is not successfully added to the shared payment account, such as if the user's payment account was determined to be inactive, locked, cancelled, and/or to have less than a threshold level of funds. The negative confirmation message also may be an audible message delivered by the VC computing device and/or a message sent from the VC computing device to the user's mobile device (e.g., a text/SMS message sent to the user's smart phone or an email sent to the user's email address).

In response to receipt and/or verification of the secondary user information, the VC computing device is configured to transmit the secondary user information identifying the secondary user payment account of each secondary user to the DC computing device for linkage to the shared payment account in the database. As noted above, in some embodiments, the process described above to obtain secondary user information may also be used to obtain primary user account information.

In some embodiments, the VC computing device further transmits a sharing allocation to the DC computing device. For example, the VC computing device includes the sharing allocation in the shared payment account initialization request. For another example, the VC computing device includes the sharing allocation in the secondary user information, or in a separate transmission. The VC computing device is configured to convert a voice command from the primary user into proportions for distribution of the transaction amount among user accounts. For example, the VC computing device is configured to recognize the word "even" or "evenly" in the group purchase voice command as an instruction to split the transaction amount evenly among each of the primary user payment account and secondary user accounts. For another example, the VC computing device is configured to recognize an absence of specific allocation instructions in the group purchase voice command as an implicit instruction to split the transaction amount evenly among each of the primary user payment account and secondary user accounts. For another example, the VC computing device is configured to recognize words such as "proportion" or "percentage" in the group purchase voice command as an instruction to allocate proportions of the transaction amount to each of the primary user payment account and the at least one secondary user payment account in sequence according to specified numeric values. The VC computing device may recognize the numeric values in the group purchase voice command, or may prompt the primary user to specify the numeric values in a subsequent voice command.

In certain embodiments, the VC computing device further stores a name for the shared payment account and transmits the name to the DC computing device for linkage to the shared payment account in the database. For example, the VC computing device is configured to recognize the term "group name" in the group purchase voice command as an instruction to name the shared payment account to facilitate re-use of the shared payment account for future transactions by the group. For another example, the VC computing device is configured to generate a default group name based on the secondary user information.

In some embodiments, the DC computing device is configured to associate a validity period with the shared payment account in the database, and validate a transaction date of the transaction authorization request against the validity period before authorizing transactions submitted using the shared payment account identifier. For example, the VC computing device is configured to recognize the term "time period" in the group purchase voice command as an instruction to keep the shared payment account active for the stated time period to facilitate re-use of the shared payment account for future transactions by the group. The VC computing device submits the time period to the DC computing device for storage in the database. For another example, in the absence of any instruction to the contrary, the VC computing device is configured to set the validity time period to a short time period, e.g. 30 minutes, to secure the shared payment account identifier against fraudulent re-use. Additionally or alternatively, a similar re-use limitation is submitted via the VC computing device and stored by the DC computing device based on number of allowable uses of the shared payment account identifier for transactions.

Once the shared payment account has been linked successfully to the primary user and secondary user data, the DC computing device transmits the shared payment account identifier to the VC computing device. In response to a subsequent voice command to make a group purchase, the VC computing device uses the shared payment account identifier, rather than the previously established primary user payment account, for the designated group purchase. In other words, in generating a purchase order for electronic submission the merchant, such as via the Internet, based on the voice command, the VC computing device identifies payment processing network "A" as the type of payment and includes the shared payment account identifier as the payment instrument. Moreover, the DC computing device, via the database, enables the payment processing network to map the shared payment account identifier to the underlying primary user account and the at least one secondary user account. Accordingly, when the shared payment account identifier is included in a transaction authorization request submitted by a merchant to the payment processing network, the payment processing network recognizes the shared payment account identifier and refers to the DC computing device to map the shared payment account identifier into the underlying user accounts. The DC computing device applies respective portions of the transaction amount against each of the primary user account and the at least one secondary user payment account linked to the shared payment account identifier. Thus, the cost of the group purchase is successfully shared among the group, while keeping each group member's individual/personal account information private from the merchant. Additionally or alternatively, application of the respective portions of the transaction amount against each of the primary user account and the at least one secondary user payment account includes application of account control parameters associated with one or more of the secondary user accounts, such as per-purchase cost limits, purchase type restrictions, merchant restrictions, merchant category restrictions, geographic location restrictions, and the like. The VSP system is also configured to transmit the virtual shared account identifier to the merchant such that the merchant will have a single payment instrument (e.g., the virtual account number) to authorize for the purchase. Accordingly, the merchant will not see that the purchase is a shared payment group purchase, nor will the merchant have access to any of the group members' individual/personal payment accounts, thereby reducing a risk of compromise of the group members' individual/personal payment accounts.

The VSP system described herein, including the DC computing device and the VC computing device, provides an easy and efficient group purchase experience, by enabling the merchant to utilize solely payment processing network infrastructure designed to accommodate a single payment account. Shared payment for the group purchase is achieved by creation of a virtual shared payment account that safely combines multiple payment methods, such that interaction with the merchant includes a single account number and enables a seamless shared payment group purchase transaction.

The methods and systems described herein may be implemented using computer programming or engineering techniques including computer software, firmware, hardware, or any combination or subset therefor. At least one of the technical problems addressed by this system includes: (i) lack of merchant-side payment processing network infrastructure for shared payment services for jointly-funded group purchases; (ii) lack of architecture to enable shared payment group purchasing experiences via voice-controlled smart devices; (iii) lack of real-time payment settlement when a single user pays the total cost for a group purchase and must wait for reimbursement; (iv) increased fraud vulnerability when each user of a group is required to provide personal payment account information to a merchant for a group purchase; and (v) lack of a centralized database for storing virtual shared payment account data associated with shared payment group purchases.

The technical effect of the systems and methods described herein is achieved by performing at least one of the following steps: (i) receiving, from the VC computing device, a shared payment account initialization request identifying a primary user payment account associated with a primary user of the VC computing device, (ii) creating a shared payment account linked in the database to the primary user payment account, (iii) receiving secondary user information identifying at least one secondary user payment account, (iv) linking in the database the at least one secondary user payment account to the shared payment account, (v) transmitting a shared payment account identifier to the VC computing device, wherein the shared payment account identifier is linked in the database to the shared payment account, (vi) receiving, via the payment network, a transaction authorization request including the shared payment account identifier, a merchant identifier, and a transaction amount, and (vii) applying respective portions of the transaction amount against each of the primary user account and the at least one secondary user payment account linked to the shared payment account identifier..

The resulting technical effect achieved by the systems and methods described herein is at least one of: (i) improved shared payment services for group purchases, including ease of use for both consumers/users and merchants, without requiring a modification to merchant-side payment processing network infrastructure; (ii) improved functionality for voice-controlled smart devices, including shared payment group purchase services; (iii) improved network speed in completing group purchases from a merchant when a single shared payment account number is submitted for a group of two or more consumers/users; (iv) real-time payment for each member contributing to a group purchase; (vi) elimination of over-payment for a group member having to pay for another group member's portion of a group purchase; and (vii) improved storage and unique database structuring for dedicated virtual shared payment account data that is specifically associated with shared purchases by a particular payment group.

In one embodiment, a computer program is provided, and the program is embodied on a computer-readable medium. In an example embodiment, the VSP system is executed on a single computer system, without requiring a connection to a sever computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the VSP system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to providing an on-demand ecosystem in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment processing system 100 in data communication with a virtual shared payment (VSP) system 101 via a payment processing network 130. In the example embodiment, payment processing system 100 is as a credit card payment system, such as the MASTERCARD payment card system, and payment processing network 130 is a payment card "interchange" or "interchange network." The Mastercard payment card system payment processing network 130 is a proprietary communications standard promulgated by Mastercard International Incorporated for the exchange of financial transaction data between financial institutions that are members of Mastercard International Incorporated. (MASTERCARD is a registered trademark of Mastercard International Incorporated located in Purchase, New York). Alternatively, payment processing network 130 is any suitable payment processing network.

In the example embodiment, a financial institution such as an issuer 150 issues a payment card for an account 152, such as a credit card account or a debit card account, to a primary user 102, who typically uses the payment card to tender payment for a purchase from a merchant 140. For example, in various scenarios, primary user 102 may present to merchant 140 the physical payment card, which stores primary user account data for example on a magnetic stripe and/or chip; may submit primary user account data to merchant 140 via telephone or the Internet; and/or may store primary user account data in a payment application on a mobile device, e.g., within a digital wallet.

For illustration, the use of payment processing system 100 for typical (i.e., non-shared) transactions by primary user 102 will be described first, and then embodiments of shared payment account transactions will be described thereafter. In a typical (non-shared) transaction, to accept payment from primary user payment account 152, merchant 140 must normally establish an account with a financial institution that is part of the financial payment system. This financial institution is usually called the "merchant bank" or the "acquiring bank" or "acquirer bank" or simply "acquirer" 142. When primary user 102 tenders payment for a purchase with a payment card (also known as a financial transaction card), merchant 140 requests authorization from acquirer 142 for the amount of the purchase. Such a request is referred to herein as an authorization request message (e.g., ISO® 8583 compliant messages and ISO® 20022 compliant messages). The request may be performed over the telephone, but is usually performed through the use of a point-of-interaction terminal, which communicates electronically with the transaction processing computers of acquirer 142. Point-of-interaction terminals include point-of-sale (POS) devices, ATM devices, and remote transaction devices that are associated with merchant 104. Alternatively, acquirer 142 may authorize a third party (not shown) to perform transaction processing on its behalf. In this case, the point-of-interaction terminal will be configured to communicate with the third party. Such a third party is usually called a "merchant processor" or an "acquiring processor."

For card-not-present (CNP) transactions, primary user 102 provides payment information or billing data associated with the payment card electronically, e.g. via a user computing device. In the example embodiment, primary user 102 provides payment information or billing data associated with the payment card via a voice-controlled (VC) computing device 110 to merchant 140. The payment information received by merchant 140 is stored and transmitted to acquirer 142 and/or payment processing network 130 as part of a transaction authorization request message. In some embodiments, merchant 140 transmits a plurality of authorization request messages together as a "batch" file to acquirer 142 and/or payment processing network 130.

Using payment processing network 130, the computers of acquirer 142 or the merchant processor will communicate with the computers of issuer 150, to determine whether the primary user payment account 152 is in good standing and whether the purchase is covered by the primary user's available credit line or account balance. Based on these determinations, the request for authorization will be declined or accepted. If the request is accepted, an authorization code is issued to merchant 140.

When a request for authorization is accepted, the available credit line or available balance of primary user payment account 152 is decreased. Normally, a charge is not posted immediately to a cardholder's account because bankcard associations, such as Mastercard International Incorporated, have promulgated rules that do not allow a merchant to charge, or "capture," a transaction until goods are shipped or services are rendered. When a merchant ships or delivers the goods or services, merchant 104 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, primary user payment account 152 is decreased. Normally, a charge is posted immediately to primary user payment account 152. The bankcard association then transmits the approval to the acquiring processor for distribution of goods/services, information, or cash in the case of an ATM.

After a transaction is captured, the transaction is settled between merchant 140, acquirer 142, and issuer 150. Settlement refers to the transfer of financial data or funds between the merchant's account, acquirer 142, and issuer 150 related to the transaction. Usually, transactions are captured and accumulated into a "batch," which is settled as a group.

At least one secondary user 104 has a corresponding secondary user payment account 156 with a corresponding issuer 154. In the example embodiment, each secondary user 104 is capable of making non-shared payments from the corresponding secondary user payment account 156 via payment processing network 130 in the same fashion as described above for primary user 102. However, if primary user 102 and at least one secondary user 104 wish to make a shared purchase in a card-not-present transaction, such as ordering a pizza from merchant 140 using a simple voice command to VC computing device 110, known payment processing systems require a single user from among primary user 102 and the at least one secondary user 104 to electronically submit the corresponding single user payment account information, be charged the full amount of the transaction, and collect reimbursement in a separate process from the others of primary user 102 and the at least one secondary user 104, such as by asking for cash reimbursement or expecting the others to make full payment in turn for subsequent similar purchases. In contrast, VSP system 101 enables primary user 102 and the at least one secondary user 104 to automatically share the cost of a card-not-present transaction with merchant 140 equally, or according to any selected proportion, while simultaneously enabling merchant 140 to receive the transaction request and submit the transaction through payment processing network 130 in standard fashion using existing point-of-sale architecture. Thus, VSP system 101 adds new and improved functionality to payment processing network 130 as compared to known systems.

Throughout the payment transaction process, VSP system 101 is in data communication with several other components of system 100, particularly primary user 102, the at least one secondary user 104, merchant 140, and payment processing network 130. VSP system 101 includes VC computing device 110 and a data controller (DC) computing device 120 that is communicatively coupled to VC computing device 110. VSP system 101 further includes a database 126 that is accessible to DC computing device 120 and is configured to store and/or otherwise maintain a variety of information, as described further herein. Moreover, in the example embodiment, database 126 is accessible to payment processing network 130, either directly or via DC computing device 120. VC computing device 110 is configured to interact with primary user 102 and the at least one secondary user 104 in response to voice commands, while DC computing device 120 is configured to simultaneously store data (e.g., data relating to primary user 102 and the at least one secondary user 104, as well as virtual shared payment account data) and create a unique data structure for database 126 as discussed below with respect to FIG. 3.

In the example embodiment, DC computing device 120 includes a processor 122 for executing instructions. Instructions may be stored in a memory area 124, for example. Processor 122 may include one or more processing units (e.g., in a multi-core configuration). Processor 122 is operatively coupled to at least one communication interface such that DC computing device 120 is capable of communicating with remote devices and systems such as VC computing device 110 and payment processing network 130. For example, DC computing device 120 communicates with VC computing device 110 via an Internet connection.

Processor 122 is also be operatively coupled to database 126. Database 126 is implemented on one or more storage devices that include any computer-operated hardware suitable for storing and/or retrieving data. For example, database 126 may be housed on multiple storage units such as hard disks or solid state disks in a redundant array of inexpensive disks (RAID) configuration, and/or may include a storage area network (SAN) and/or a network attached storage (NAS) system. In some embodiments, database 126 is integrated in DC computing device 120. For example, DC computing device 120 includes one or more hard disk drives that store database 126. In other embodiments, database 126 is external to DC computing device 120 and may be accessed by a plurality of server computing devices in addition to DC computing device 120, including by server devices of payment processing network 130. In some embodiments, processor 122 is operatively coupled to database 126 via a storage interface. The storage interface is any component capable of providing processor 122 with access to database 126, and may include, for example, an Advanced Technology Attachment (ATA) adapter, a Serial ATA (SATA) adapter, a Small Computer System Interface (SCSI) adapter, a RAID controller, a SAN adapter, and/or a network adapter.

Memory area 124 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

As noted above, in the example embodiment, VC computing device 110 is operable by primary user 102 to make purchases from merchant 140 via the Internet (as well as perform other tasks, such as paying bills or invoking a search engine) in response to voice commands from primary user 102. For example, VC computing device 110 is an Amazon ECHO® (Amazon and Amazon ECHO are registered trademarks of Amazon.com Incorporated located in Seattle, Washington), a Google HOMETM (Google and Google HOME are trademarks of Google Incorporated located in Mountain View, California), or other device capable of performing tasks on-line in response to voice commands. The basic functionality of such devices is well-known and need not be described in further detail here. However, VC computing device 110 configured for use in VSP system 101 in embodiments of the disclosure has additional, unique functionality as described below.

Figure 2:
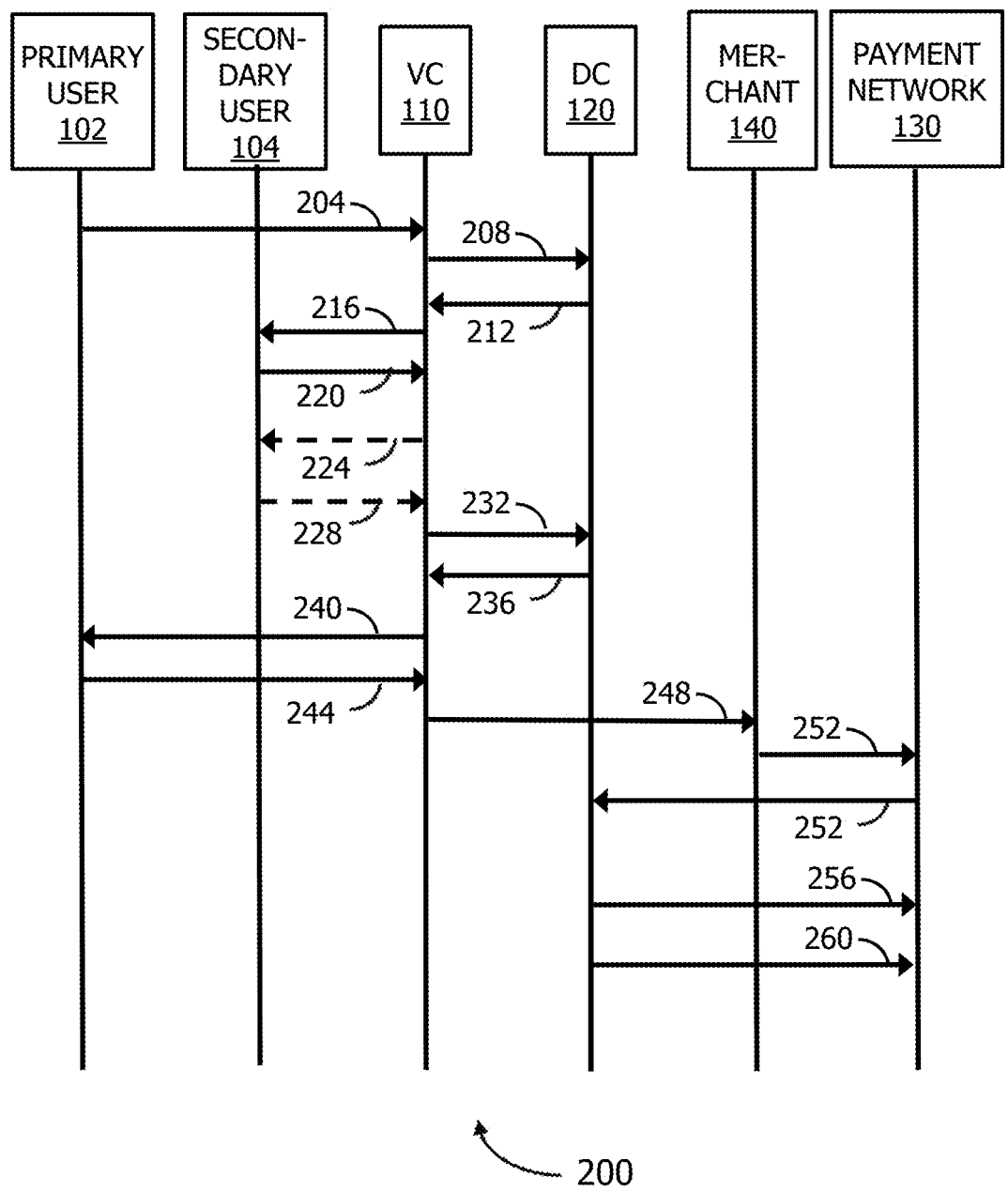
FIG. 2 is an example of a data flow process for making a shared payment group purchase over a payment network using the VSP system shown in FIG. 1.

FIG. 2 is an example of a data flow process 200 for making a shared payment group purchase over a payment network using VSP system 101. With reference to FIGS. 1 and 2, in the example embodiment, process 200 is initiated when VC computing device 110 receives a "group purchase" voice command 204 from primary user 102. For example, primary user 152 says an activation word to activate VC computing device 110, followed by a spoken command such as "create a group payment for three people, evenly shared." VC computing device 110 is programmed to recognize voice command 204. In response to group purchase voice command 204, VC computing device 110 generates an electronic signal, designated as a shared payment account initialization request 208, and transmits shared payment account initialization request 208 to DC computing device 120 via the Internet.

In the example embodiment, VC computing device 110 stores a profile for primary user 102 that that identifies primary user payment account 152. VC computing device 110 is configured to automatically identify primary user payment account 152 in shared payment account initialization request 208. Alternatively, VC computing device 110 is configured to prompt primary user 102 to identify a payment account to use as primary user payment account 152 for the group purchase, and primary user 102 provides the requested information by voice or other suitable means of data entry to VC computing device 110. In some embodiments, VC computing device 110 is programmed to initially assign primary user payment account 152 based on the primary user profile, but to override the initial assignment and prompt for different account information in response to an "account" voice command by primary user 102.

In the example embodiment, in response to shared payment account initialization request 208, DC computing device 120 is configured to create a shared payment account linked in database 126 to primary user payment account 152. In some embodiments, DC computing device 120 verifies, via payment processing network 130, that primary user payment account 152 is an active account in good standing prior to creating and storing the shared payment account in database 126. In the example embodiment, in response to successful creation and storage in database 126 of the shared payment account, DC computing device 120 sends a "shared account created" notification signal 212 to VC computing device 110. If primary user payment account 152 is not successfully verified or if creation of the shared payment account is unsuccessful for any other reason, DC computing device 120 sends a "shared account not created" notification signal to VC computing device 110, and VC computing device 110 announces to primary user 102 and the at least one secondary user 104 that the shared group payment cannot be completed. In alternative embodiments, DC computing device 120 does not send a notification signal to VC computing device 110 at this stage of process 200.

In the example embodiment, VC computing device 110 is configured to announce, in response to notification signal 212, a secondary user information request 216 from the at least one secondary user 104. Alternatively, VC computing device is configured to announce secondary user information request 216 other than in response to notification signal 212. Secondary user information request 216 is configured to obtain data form each secondary user 104 identifying the corresponding secondary payment account 156 to be associated with the shared payment account. In some embodiments, secondary user information request 216 is transmitted as an audio/voice prompt by VC computing device 110 requesting data from each secondary user. For example, VC computing device 110 determines the number of secondary users from group purchase voice command 204, or alternatively prompts primary user 102 to say the number of additional users. For example, if primary user 102 is named "John," the VC computing device says, "Group payment for three people created. John's account included. Who's next and what's your payment type?" Payment types may include bank accounts, credit cards, debit cards, prepaid cards, PAYPAL accounts, VENMO accounts, and the like. In some embodiments, all secondary users 104 provide the same type of payment account. In other embodiments, at least two secondary users 104 of the group will provide different types of payment accounts. DC computing device 120 populates the virtual account with relevant data.

In response to secondary user information request 216, each secondary user 104 provides identifying information 220 for the corresponding secondary user payment account 156 to VC computing device 110. In some embodiments, identifying information 220 directly identifies secondary user payment account 156 to VC computing device 110. For example, secondary user 104 speaks a payment card number or other payment account number associated with secondary user payment account 156, and optionally other payment card/account related information (e.g., a PIN number, an expiration date, and/or a security code number) to VC computing device 110. VC computing device 110 converts identifying information 220 for each secondary user payment account 156 to an electronic secondary account information signal 232 and forwards signal 232 to DC computing device 120.

In other embodiments, identifying information 220 identifies a communication channel by which VC computing device 110 may obtain secondary user payment account 156. For example, secondary user 104 speaks a phone number or email address to VC computing device 110 as identifying information 220. In response to receiving the phone number or email address, VC computing device 110 is configured to transmit a secondary user payment account request message 224 to secondary user 104 via the phone number or email address. For example, request message 224 includes a link to an application or a web-hosted payment page. Secondary user 104 accesses request message 224, for example on the secondary user's mobile device (e.g., a smart phone, table, etc.), and the included link directs secondary user 104 to select a payment method as secondary user payment account 156 based on the secondary user's digital wallet or, alternatively, provides fillable data fields for secondary user 104 to populate with data defining secondary user payment account 156 (e.g., a bank/ checking account, a debit card, a credit card, a prepaid card). The secondary user's identifying information selection 228 is transmitted from the secondary user's device as electronic secondary account information signal 232 directly to DC computing device 120, or alternatively to VC computing device 110 and forwarded as signal 232 to DC computing device 120. As noted above, in some embodiments, the process described above to obtain secondary user account information may also be used to obtain primary user account information.

In response to receiving electronic secondary account information signal 232, DC computing device 120 is configured to link, in database 126, the at least one secondary user payment account 156 to the shared payment account. More specifically, the shared payment account identifier is linked in database 126 to the shared payment account and is a virtual account number, i.e., the shared payment account identifier is not associated with a fully functional payment account but has the form and appearance of a traditional payment account identifier suitable for submission by merchant 140 through payment processing network 130. In some embodiments, DC computing device 120 verifies, via payment processing network 130, that each secondary user payment account 156 is an active account in good standing prior to linking the secondary user payment account 156 to the shared payment account in database 126.

In the example embodiment, in response to successful linking in database 126 of all designated secondary user payment accounts 156 to the shared payment account, DC computing device 120 transmits a shared payment account identifier 236 to VC computing device 110. Moreover, DC computing device 120 links shared payment account identifier 236 in database 126 to the shared payment account, thereby enabling payment processing network 130 to map shared payment account identifier 236 to the underlying primary user account 152 and the at least one secondary user account 156. If fewer than all designated secondary user payment accounts 156 are successfully linked to the shared payment account (e.g., secondary user payment account 156 is not successfully verified or linking is unsuccessful for any other reason), DC computing device 120 sends an error notification signal to VC computing device 110, and VC computing device 110 announces to primary user 102 and the at least one secondary user 104 that the shared group payment does not include the corresponding secondary user 104. In alternative embodiments, DC computing device 120 does not send an error notification signal to VC computing device 110 at this stage of process 200.

In some embodiments, VC computing device 110 further transmits a sharing allocation to DC computing device 120, as described above. For example, VC computing device 110 transmits the sharing allocation in one of shared payment account initialization request 208, secondary account information signal 232, and a separate dedicated signal (not shown).

In certain embodiments, VC computing device 110 further stores a name for the shared payment account and transmits the name to DC computing device 120 for linkage to the shared payment account in database 126, as described above, to facilitate re-use of the shared payment account for future transactions by the group.

In some embodiments, DC computing device 110 is configured to associate a validity period and/or a number of allowable uses with the shared payment account in database 126, and validate a transaction date of a subsequent transaction authorization request 252 against the validity period and/or number of allowable uses before authorizing transactions submitted using shared payment account identifier 236, as described above.

In the example embodiment, VC computing device 110 is configured to announce 240, in response to receiving shared payment account identifier 236, that the shared payment account is ready for use. Subsequently, VC computing device 110 receives a "purchase" voice command 244 from primary user payment account 152, or, alternatively, secondary user 104, to make a purchase using the shared payment account. In response to purchase voice command 244, VC computing device 110 transmits a purchase order 248 for the requested item to merchant 140, such as via the Internet. For example, in response to the reference to the shared purchase account in purchase voice command 244, VC computing device 110 generates purchase order 248 to identify payment processing network 130 as the type of payment and to identify shared payment account identifier 236 as the payment instrument.

In response to purchase order 248, merchant 140 generates a transaction authorization request 252 including the shared payment account identifier received in purchase order 248, a merchant identifier associated with merchant 140, and a transaction amount. For example, transaction authorization request 252 is generated by a point-of-sale (POS) device at merchant 140. In the example embodiment, merchant 140 receives no indication that shared payment account identifier 236 is a virtual account number and no indication that shared payment account identifier 236 is associated with a group, rather than an individual. Moreover, merchant 140 is able to use shared payment account identifier 236 in transaction authorization request 252 with no modification to the hardware or software typically used by merchant 140 to submit traditional transactions via payment processing network 130.

In the example embodiment, transaction authorization request 252 is routed from merchant 140 through acquirer 142 and to payment processing network 130, as described above. Payment processing network 130 recognizes shared payment account identifier 236 as associated with a shared payment account, e.g. via a table look-up or an indicator embodied in a portion of shared payment account identifier 236, and routes transaction authorization request 252 to DC computing device 120. DC computing device 120 maps shared payment account identifier 236 to the underlying primary user account 152, the at least one secondary user account 156, and the sharing allocation using the shared payment account record in database 126. DC computing device 120 applies respective portions of the transaction amount, based on the sharing allocation, against each of the primary user account 152 and the at least one secondary user payment account 156. For example, DC computing device 120 generates substitute transaction authorization request 256, including primary user payment account 152 and the respective portion of the transaction amount attributed to primary user 102, and routes substitute transaction authorization request 256 through payment processing network 130 to issuer 150. Similarly, DC computing device 120 generates at least one substitute transaction authorization request 260, including the corresponding secondary user payment account 156 and the portion of the transaction amount attributed to the corresponding secondary user 104, and routes substitute transaction authorization request 260 through payment processing network 130 to the corresponding issuer 154. In some embodiments, substitute transaction authorization request 260 enables application of account control parameters associated with one or more of secondary user payment accounts 156, such as per-purchase cost limits, purchase type restrictions, merchant restrictions, merchant category restrictions, geographic location restrictions, and the like, to the portion of the transaction associated with the corresponding user. In certain embodiments, for each secondary user 104 having an "off network" secondary user payment account 156, DC computing device 120 and/or payment processing network 130 provide additional routing instructions and message formatting to process the corresponding substitute transaction authorization request 260.

In some embodiments, rather than separate individuals using VSP system 101 to make a group purchase, primary user 102 uses VSP system 101 to purchase an item from merchant 140 and distribute the cost among multiple funding sources or accounts associated with primary user 102. In such embodiments, primary user 102, rather than at least one secondary user 104, provides to VC computing device 110 identifying information 220, and in some embodiments identifying information selection 228, for each corresponding secondary user payment account 156 associated (in these embodiments) with primary user 102. VSP system 101 handles the payment process as described above, sharing the transaction amount according to the sharing allocation among primary user account 152 and the at least one secondary user account 156 all associated with primary user 102. In such embodiments, VSP system 101 enables primary user 102 to make the desired purchase while simultaneously achieving other goals of primary user 102 including, without limitation, avoiding maxing out a credit limit, avoiding overdrawing a bank account, maximizing purchasing rewards on each account of primary user 102, and the like. Moreover, VSP system 101 simultaneously enables merchant 140 to receive the transaction request and submit the transaction through payment processing network 130 in standard fashion using existing point-of-sale architecture, rather than requiring merchant 140 to split the transaction into multiple sub-transactions using separate payment instruments at the point of sale.

Figure 3:
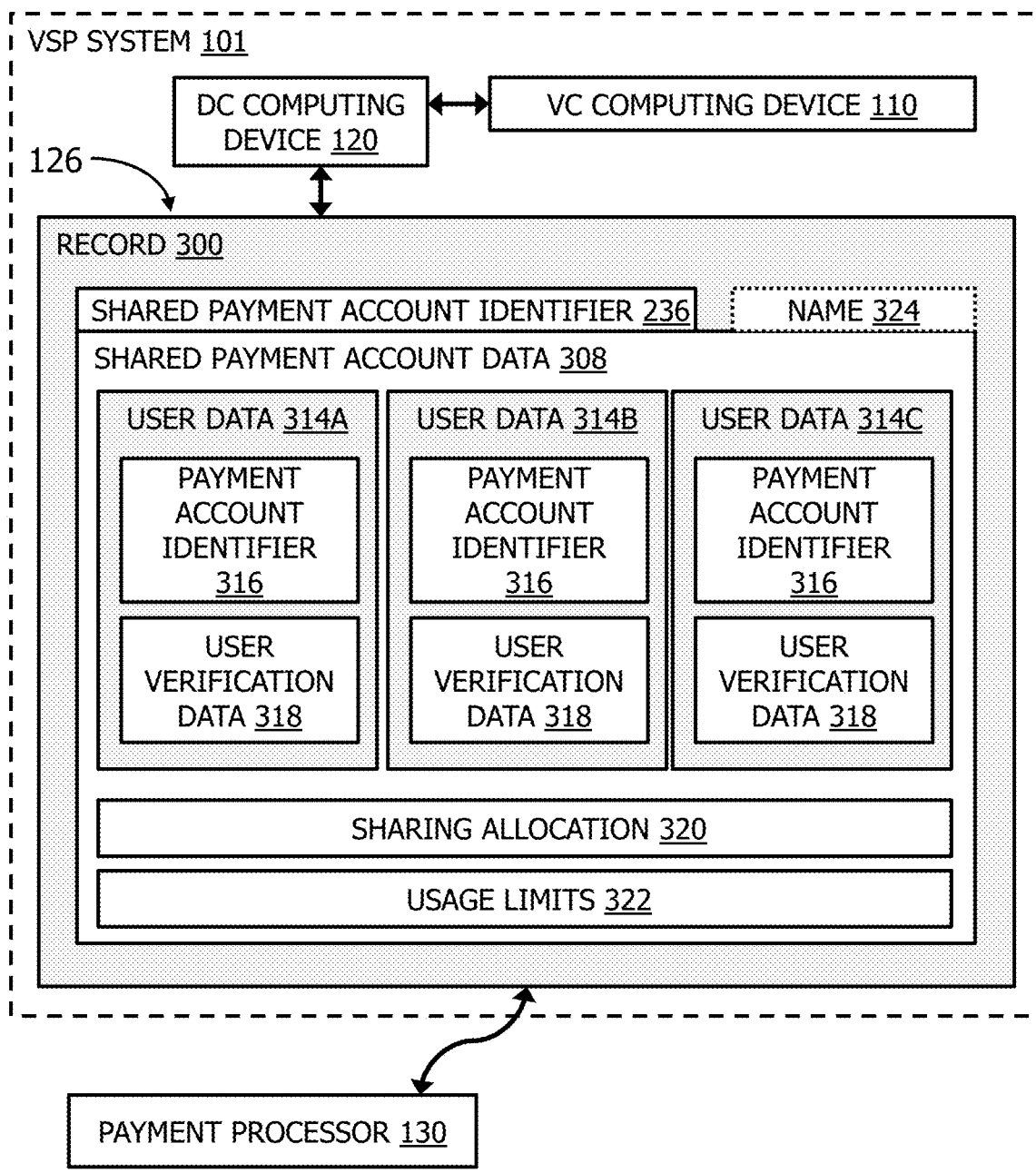
FIG. 3 is a schematic illustration of an example structure of a database for use with the VSP system shown in FIG. 1.

FIG. 3 is a schematic illustration of an example structure of a record 300 stored in database 126. In the example embodiment, database 126 includes unique data configurations for record 300 specifically suitable for enabling efficient, real-time shared payment group purchases initiated from VC computing device 110 using a virtual shared payment account. In particular, record 300 facilitates ease of re-use of the shared payment account for subsequent purchases by the same group, without requiring the group members to repeat the group configuration process. Record 300 includes shared payment account identifier 236 and virtual shared payment account data 308. In some embodiments, as discussed above, the shared payment account may be given a name 324 as an identifier in addition to shared payment account identifier 236.

In the example embodiment, each record 300 includes a plurality of user data records 314. For example, in the illustrated embodiment, record 300 includes user data record 314A associated with primary user 102, and user data records 314B and 314C associated with two secondary users 104. Each user data record 314 includes at least one payment account identifier 316 used to identify the corresponding one of primary user payment account 152 and the at least one secondary user payment account 156. In some embodiments, each user data record 314 further includes user verification data 318 that submitted to verify/authenticate the corresponding one of primary user 102 and the at least one secondary user 104. In the example embodiment, verification data 318 includes voice recognition sample data captured by VC computing device 110. Additionally or alternatively, verification data 318 includes other biometric sample data such as retina scan, fingerprint, face recognition data, and any other type of biometric data. Additionally or alternatively, verification data 318 includes a password, a PIN number, a verification code, and/or a token submitted from at least one of VC computing device 110 and a user's computing device.

In the example embodiment, record 300 also includes sharing allocation 320, which embodies proportions for distribution of the transaction amount of the group purchase among primary user payment account 152 and the at least one secondary user payment account 156, as described above. Sharing allocation 320 may be stored as values for each user in the form of percentages (adding to 100 percent) or decimal proportions (adding to 1), for example.

In the example embodiment, record 300 also includes usage limits 322, such as a validity period of, and/or a number of allowable uses of, shared payment account identifier 236 for transactions, as described above. Usage limits 322 may be stored as one or more of an expiration date for shared payment account identifier 236 and a number of remaining allowed uses for shared payment account identifier 236, for example.

Additionally or alternatively, record 300 includes any other suitable information that enables VSP system 101 to function as described herein.

Figure 4:
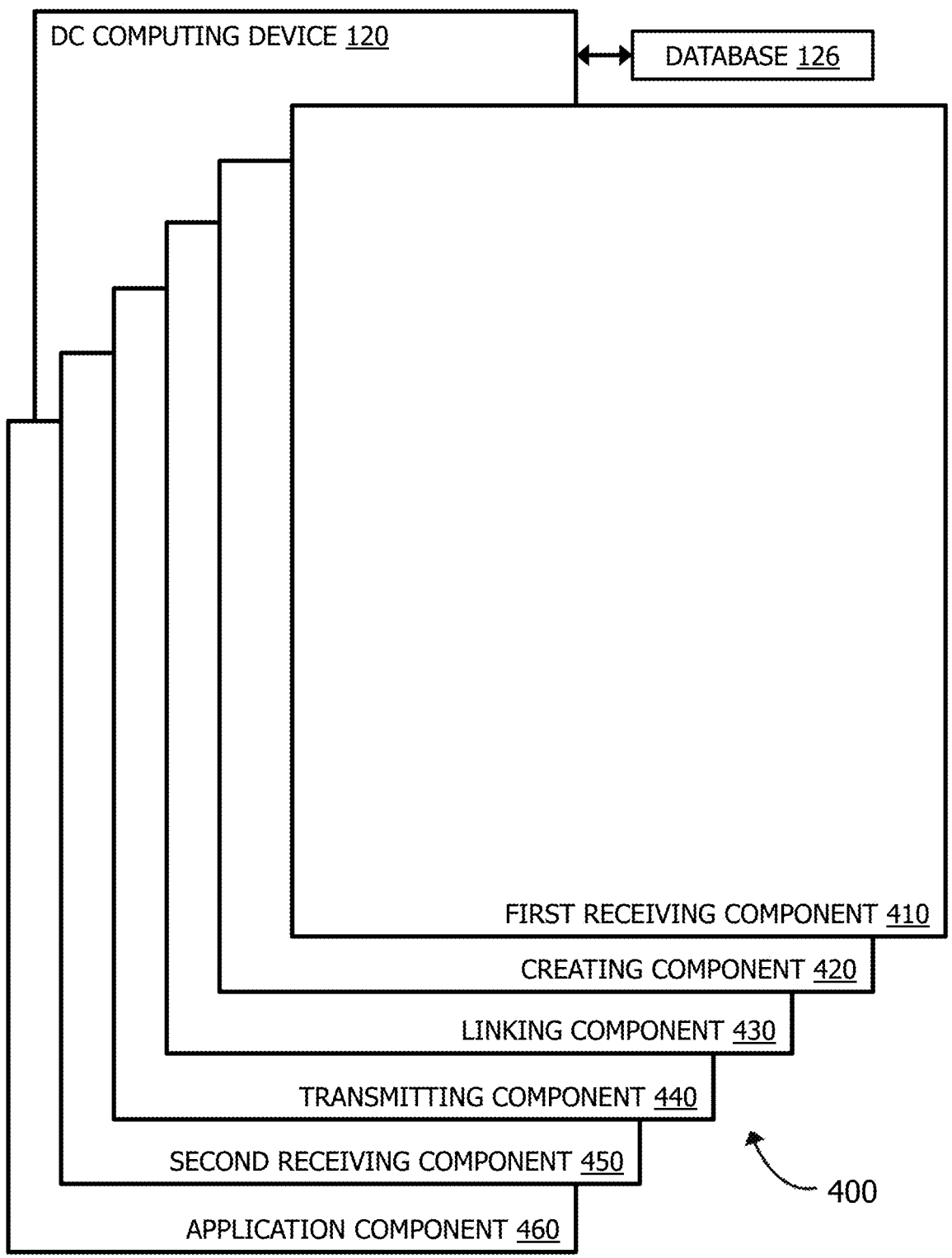
FIG. 4 is a diagram of components of an example DC computing device that may be used in the VSP system shown in FIG. 1.

FIG. 4 is a schematic diagram of example components 400 of DC computing device 120. For example, components 400 are segments of computer code stored in memory area 124 and executable by processor 122 to perform specific tasks. As noted above, processor 122 interfaces with database 126 to receive, transmit, and/or update information as required by each of components 400.

In the example embodiment, components 400 include a first receiving component 410 configured to receive signals from VC computing device 110, such as shared payment account initialization request 208 and electronic secondary account information signal 232. Components 400 further include a creating component 420 configured to create the shared payment account, and a linking component 430 configured to link primary user payment account 152 and the at least one secondary user payment account 156 to the shared payment account in database 126. Components 400 further include a transmitting component 440 configured to transmit signals to VC computing device 110, such as shared payment account identifier 236. Additionally, components 400 include a second receiving component 450 configured to receive signals from payment processing network 130, such as transaction authorization request 252. Components 400 also include an application component 460 configured to apply respective portions of the transaction amount against each of primary user account 152 and the at least one secondary user payment account 156 linked to the shared payment account identifier. Components 400 may include additional or alternative components that enable VSP system 101 to function as described herein, such as a receiving component for information received from a mobile device of at least one secondary user 104.

Described herein are computer systems such as a payment processor (such as a payment network), a remote device (such as a VC computing device, a merchant computing device, and user computing devices) and a DC computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above examples are for example only, and are thus not intended to limit in any way the definition and/or meaning of the term "processor."

The terms database and memory, as used herein, refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, N.Y.; Microsoft is a registered trademark of Microsoft Corporation, Redmond, Washington; and Sybase is a registered trademark of Sybase, Dublin, Calif.)

As used herein, the terms "software" and "firmware" are interchangeable, and include any computer program stored in memory for execution by a processor (e.g., 304, 404), including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be included in payment data received by the DC computing device in communication with the VC computing device and used as a method of payment for performing a transaction (e.g., making a group purchase).

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more non-transitory computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the DC and VC computing devices are described herein as including general processing and memory devices, it should be understood that the DC computing device in communication with the VC computing device is a specialized computer system configured to perform the steps described herein for providing a virtual shared payment system to integrate group purchasing with voice-activated smart devices.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A data controller (DC) computing device for making a shared payment group purchase over a payment network, the DC computing device comprising a processor and a memory, the DC computing device communicatively coupled to a database and configured to:
   receive, from a voice-controlled (VC) computing device, a shared payment account initialization request identifying a primary user payment account associated with a primary user of the VC computing device;
   create a shared payment account linked in the database to the primary user payment account;
   cause the VC computing device to audio prompt for secondary user information identifying at least one secondary user payment account;
   receive, from the VC computing device, the secondary user information identifying the at least one secondary user payment account;
   link in the database the at least one secondary user payment account to the shared payment account;
   transmit, to the VC computing device, a single payment instrument comprising a shared payment account identifier having a form and appearance suitable for submission by merchants through the payment network for payment card transactions, wherein the shared payment account identifier is linked in the database to the shared payment account, and wherein a portion of the shared payment account identifier comprises an indicator configured to cause the payment network to route transaction authorization requests that include the shared payment account identifier to the DC computing device, wherein transaction authorization requests are initiated by merchants and transmitted over the payment network;
   receive, from the VC computing device, a purchase voice command to make a purchase from a merchant using the shared payment account;
   generate, in response to receiving the purchase voice command, a purchase order comprising the shared payment account identifier;
   transmit, to a point-of-sale (POS) device associated with the merchant, the purchase order comprising the shared payment account identifier as the single payment instrument;
   receive, via the payment network in response to recognition of the indicator included in the shared payment account identifier, a single transaction authorization request initiated by the POS device to the payment network, the received single transaction authorization request including the shared payment account identifier as the single payment instrument for a transaction associated with the purchase order, a merchant identifier associated with the merchant for the transaction, and a transaction amount;
   split the transaction amount into respective portions allocable to the primary user account and the at least one secondary user payment account linked to the shared payment account identifier by generating, in response to receiving the single transaction authorization request including the shared payment account identifier, multiple transaction authorization requests including a respective substitute transaction authorization request for each of the primary user payment account and the at least one secondary user account, wherein the primary user payment account and the at least one secondary user account are not exposed to the POS device associated with the merchant; and apply the respective portions of the transaction amount against each of the primary user account and the at least one secondary user payment account linked to the shared payment account identifier by routing each respective substitute transaction authorization request through the payment network to a respective issuer.

2. The DC computing device of claim 1, further configured to:
associate a validity period with the shared payment account in the database; and
validate, prior to applying the respective portions of the transaction amount, a transaction date of the transaction authorization request against the validity period.

3. The DC computing device of claim 2, further configured to:
receive, via the payment network, a second transaction authorization request including the shared payment account identifier, a second merchant identifier, and a second transaction amount;
validate a transaction date of the second transaction authorization request against the validity period; and
apply, in response to successfully validating the transaction date of the second transaction authorization request, respective portions of the second transaction amount against each of the primary user account and the at least one secondary user payment account linked to the shared payment account identifier.

4. The DC computing device of claim 1, further configured to:
receive, from the VC computing device, biometric sample data for the at least one secondary user; and
verify, prior to transmitting the shared payment account identifier to the VC computing device, the biometric sample data against biometric reference data associated with the at least one secondary user payment account.

5. The DC computing device of claim 4, wherein the biometric sample data includes voice data captured by the VC computing device.

6. The DC computing device of claim 1, further configured to generate a respective substitute transaction authorization request for each of the primary user payment account and the at least one secondary user account, wherein each respective substitute transaction authorization request includes the respective portion of the transaction amount.

7. The DC computing device of claim 1, further configured to receive, from the VC computing device, a sharing allocation identifying proportions of the transaction amount to be allocated to each of the primary user payment account and the at least one secondary user payment account, wherein applying the respective portions of the transaction amount comprises applying the respective portions according to the sharing allocation.

8. A method for making a shared payment group purchase over a payment network, said method performed using a data controller (DC) computing device including a processor communicatively coupled to a memory, the DC computing device communicatively coupled to a database, said method comprising:
receiving, from a voice-controlled (VC) computing device, a shared payment account initialization request identifying a primary user payment account associated with a primary user of the VC computing device;
creating a shared payment account linked in the database to the primary user payment account;
causing the VC computing device to audio prompt for secondary user information identifying at least one secondary user payment account;
receiving, from the VC computing device, the secondary user information identifying the at least one secondary user payment account;
linking in the database the at least one secondary user payment account to the shared payment account;
transmitting, to the VC computing device, a single payment instrument comprising a shared payment account identifier having a form and appearance suitable for submission by merchants through the payment network-for payment card transactions, wherein the shared payment account identifier is linked in the database to the shared payment account, and wherein a portion of the shared payment account identifier comprises an indicator configured to cause the payment network to route transaction authorization requests that include the shared payment account identifier to the DC computing device, wherein transaction authorization requests are initiated by merchants and transmitted over the payment network;
receive, from the VC computing device, a purchase voice command to make a purchase from a merchant using the shared payment account;
generate, in response to receiving the purchase voice command, a purchase order comprising the shared payment account identifier;
transmit, to a point-of-sale (POS) device associated with the merchant, the purchase order comprising the shared payment account identifier as the single payment instrument;
receiving, via the payment network in response to recognition of the indicator included in the shared payment account identifier, a single transaction authorization request initiated by the POS device to the payment network, the received single transaction authorization request including the shared payment account identifier as the single payment instrument for a transaction associated with the purchase order, a merchant identifier associated with the merchant for the transaction, and a transaction amount;
splitting the transaction amount into respective portions allocable to the primary user account and the at least one secondary user payment account linked to the shared payment account identifier by generating, in response to receiving the single transaction authorization request including the shared payment account identifier, multiple transaction authorization requests including a respective substitute transaction authorization request for each of the primary user payment account and the at least one secondary user account, wherein the primary user payment account and the at least one secondary user account are not exposed to the POS device associated with the merchant; and
applying the respective portions of the transaction amount against each of the primary user account and the at least one secondary user payment account linked to the shared payment account identifier by routing each respective substitute transaction authorization request through the payment network to a respective issuer.

9. The method of claim 8, further comprising:
associating a validity period with the shared payment account in the database; and validating, prior to applying the respective portions of the transaction amount, a transaction date of the transaction authorization request against the validity period.

10. The method of claim 9, further comprising:
receiving, via the payment network, a second transaction authorization request including the shared payment account identifier, a second merchant identifier, and a second transaction amount;
validating a transaction date of the second transaction authorization request against the validity period; and
applying, in response to successfully validating the transaction date of the second transaction authorization request, respective portions of the second transaction amount against each of the primary user account and the at least one secondary user payment account linked to the shared payment account identifier.

11. The method of claim 8, further comprising:
receiving, from the VC computing device, biometric sample data for the at least one secondary user; and
verifying, prior to transmitting the shared payment account identifier to the VC computing device, the biometric sample data against biometric reference data associated with the at least one secondary user payment account.

12. The method of claim 11, wherein receiving the biometric sample data comprises receiving voice data captured by the VC computing device.

13. The method of claim 8, further comprising generating a respective substitute transaction authorization request for each of the primary user payment account and the at least one secondary user account, wherein each respective substitute transaction authorization request includes the respective portion of the transaction amount.

14. The method of claim 8, further comprising receiving, from the VC computing device, a sharing allocation identifying proportions of the transaction amount to be allocated to each of the primary user payment account and the at least one secondary user payment account, wherein applying the respective portions of the transaction amount comprises applying the respective portions according to the sharing allocation.

15. A non-transitory computer-readable storage medium having computer-executable instructions embodied thereon, wherein when executed by at least one processor, the at least one processor being communicatively coupled to a database, the computer-executable instructions cause the at least one processor to:
receive, from a voice-controlled (VC) computing device, a shared payment account initialization request identifying a primary user payment account associated with a primary user of the VC computing device;
create a shared payment account linked in the database to the primary user payment account;
cause the VC computing device to audio prompt for secondary user information identifying at least one secondary user payment account;
receive, from the VC computing device, the secondary user information identifying the at least one secondary user payment account;
link in the database the at least one secondary user payment account to the shared payment account;
transmit, to the VC computing device, a single payment instrument comprising a shared payment account identifier having a form and appearance suitable for submission by merchants through the payment network for payment card transactions, wherein the shared payment account identifier is linked in the database to the shared payment account, and wherein a portion of the shared payment account identifier comprises an indicator configured to cause the payment network to route transaction authorization requests that include the shared payment account identifier to the DC computing device, wherein transaction authorization requests are initiated by merchants and transmitted over the payment network;
receive, from the VC computing device, a purchase voice command to make a purchase from a merchant using the shared payment account;
generate, in response to receiving the purchase voice command, a purchase order comprising the shared payment account identifier;
transmit, to a point of sale (POS) device associated with the merchant, the purchase order comprising the shared payment account identifier as the single payment instrument;
receive, via the payment network in response to recognition of the indicator included in the shared payment account identifier, a single transaction authorization request initiated by the POS device to the payment network, the received single transaction authorization request including the shared payment account identifier as the single payment instrument for a transaction associated with the purchase order, a merchant identifier associated with the merchant for the transaction, and a transaction amount;
split the transaction amount into respective portions allocable to the primary user account and the at least one secondary user payment account linked to the shared payment account identifier by generating, in response to receiving the single transaction authorization request including the shared payment account identifier, multiple transaction authorization requests including a respective substitute transaction authorization request for each of the primary user payment account and the at least one secondary user account, wherein the primary user payment account and the at least one secondary user account are not exposed to the POS device associated with the merchant; and
apply the respective portions of the transaction amount against each of the primary user account and the at least one secondary user payment account linked to the shared payment account identifier by routing each respective substitute transaction authorization request through the payment network to a respective issuer.

16. The non-transitory computer-readable storage media of claim 15, wherein the computer-executable instructions further cause the at least one processor to:
associate a validity period with the shared payment account in the database; and
validate, prior to applying the respective portions of the transaction amount, a transaction date of the transaction authorization request against the validity period.

17. The non-transitory computer-readable storage media of claim 16, wherein the computer-executable instructions further cause the at least one processor to:
receive, via the payment network, a second transaction authorization request including the shared payment account identifier, a second merchant identifier, and a second transaction amount;
validate a transaction date of the second transaction authorization request against the validity period; and
apply, in response to successfully validating the transaction date of the second transaction authorization request, respective portions of the second transaction amount against each of the primary user account and the at least one secondary user payment account linked to the shared payment account identifier.

18. The non-transitory computer-readable storage media of claim 15, wherein the computer-executable instructions further cause the at least one processor to:
   receive, from the VC computing device, biometric sample data for the at least one secondary user; and
   verify, prior to transmitting the shared payment account identifier to the VC computing device, the biometric sample data against biometric reference data associated in the database with the at least one secondary user payment account.

19. The non-transitory computer-readable storage media of claim 15, wherein the computer-executable instructions further cause the at least one processor to generate a respective substitute transaction authorization request for each of the primary user payment account and the at least one secondary user account, wherein each respective substitute transaction authorization request includes the respective portion of the transaction amount.

20. The non-transitory computer-readable storage media of claim 15, wherein the computer-executable instructions further cause the at least one processor to receive, from the VC computing device, a sharing allocation identifying proportions of the transaction amount to be allocated to each of the primary user payment account and the at least one secondary user payment account, wherein applying the respective portions of the transaction amount comprises applying the respective portions according to the sharing allocation.

* * * * *